United States Patent Office 3,268,002
Patented August 23, 1966

3,268,002
PROCESS FOR TREATING SOILS AND RESULTING PRODUCTS
Rudolph F. Fischer, Oakland, Calif., assignor to Shell Oil Company, New York, N.Y., a corporation of Delaware
No Drawing. Filed Nov. 5, 1965, Ser. No. 506,595
7 Claims. (Cl. 166—33)

This application is a continuation-in-part of my copending patent application Serial No. 20,826, filed April 8, 1960.

This invention relates to a process for treating soils and to the resulting products. More particularly, the invention relates to a new process for treating loose or unconsolidated soils to effect a stabilization or bonding of the particles.

Specifically, the invention provides a new and particularly efficient process for treating soils to effect a stabilization or bonding of the particles which comprises adding to the soil, preferably by mixing therewith, an aqueous solution of a water-soluble salt of a polymeric polycarboxylic polyhydroxy acid having a plurality of structural units

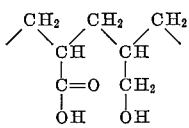

which polymeric polycarboxylic acid is obtained by reacting a polymer of acrolein or derivative thereof with a strong base and neutralizing the resulting product. The invention further provides the soil compositions stabilized by this method.

Many soils are loose and difficult to compact. This raises considerable problems in the construction of roadbeds, cuts in banks along highways, construction of mine shafts, drilling of oil wells, construction of dams, construction of airfields and the like. When new cuts are made in these operations the loose soil and exposed banks are subject to erosion through water and wind. Many attempts have been made to solve this problem by injecting various chemicals into the soil to seal the particles together. The results, however, have not been too satisfactory. In many cases, the chemicals have a detrimental effect on the soils and prevent its further use for agriculture, etc. In other cases, the chemicals are too costly to be used over large areas, such as roadbeds and the like. In other cases, the chemicals effect a complete sealing of the particles and do not permit necessary permeability by water and the like.

It is an object of the invention, therefore, to provide a new process for stabilization and bonding of soil particles. It is a further object to provide a process for stabilizing soil which has no harmful effect on the agricultural use of the soil. It is a further object to provide a process for stabilizing and bonding soil particles which is economical and easy to operate. It is a further object to provide a process for stabilizing and bonding soil particles which permits entry of water and the like. It is a further object to provide a process for consolidating soil particles in drilling, mining and construction operations. It is a further object to provide a process for consolidating soil particles in roadbeds and airfields landing strips. These and other objects of the invention will be apparent from the following detailed description thereof.

It has now been discovered that these and other objects may be accomplished by the novel process of the present invention which comprises injecting into the soil, preferably by mixing therewith, an aqueous solution of a water-soluble salt of a polymeric polyhydroxy polycarboxylic acid having a plurality of structural units

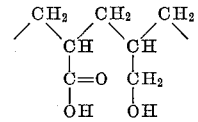

which polymeric polycarboxylic acid is obtained by reacting a polymer of acrolein or derivative thereof with a strong base and neutralizing the resulting product. It has been found that by this new process one can effect a surprising stabilization and strong bonding of soil particles. It has been further found that when the bond becomes wet it begins to loosen and permit water to penetrate, and when dried the bond again becomes strong and firm. Further, it has been found that while the bond is strong enough for stabilization of the soil for most applications yet even when applied at high rates the bond can still be broken by growing plants. This makes the process of particular value in agricultural areas to prevent loss through wind erosion but still permit the growing of the necessary crops.

The salts used in the process of the invention are the polymeric polyhydroxy polycarboxylic acids having a plurality of structural units

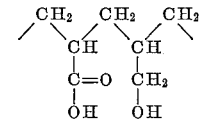

These acids are preferably obtained by treating a polymer of acrolein or derivative thereof with a strong base. The polymers of acrolein to be used in the process of the invention are the addition-type polymers obtained by polymerization through the double bonds. The polymers include the homopolymers of acroleins as well as the copolymers of acrolein with other unsaturated materials, and preferably those containing conjugated ethylenic linkages, such as butadiene, isoprene, methylpentadiene, chloroprene, and the like, and those containing a single $CH_2=C$ group, such as ethylene, propylene, isobutylene, octene, vinyl acetate, vinyl propionate, vinylpyridine, vinylnaphthalene, styrene, vinylcyclohexane, acrylonitrile, methacrylonitrile, vinyl chloride, vinylidene chloride, acrylate esters, such as, for example, methyl methacrylate, ethyl acrylate, ethyl methacrylate, butyl acrylate, and allylic compounds, such as allyl acetate, allyl alcohol, allyl butyrate, allyl benzoate, allyl cyclohexanecarboxylate, allylamine, and the like. These additional monomers are employed only in minor amounts, and in amounts preferably ranging from about 1% to 40%, and preferably in amounts ranging from about 1% to 25% by weight.

The polymers of acrolein employed may have molecular weights as low as 1000, but preferred polymers are those of high molecular weight and still more preferably those having molecular weights ranging from about 75,000 to 2,000,000, and more preferably between 100,000 and 1,000,000, as determined by the light scattering technique. The molecular weight ranges also may be indicated by intrinsic viscosity values as these are the more easily determined. Preferred polymers are those having intrinsic viscosites (as determined on the solubilized form of the polymer) of at least 0.6 and preferably 0.9 to 5.0. These values are determined by the conventional technique of polyelectrolyte (0.5 N $Na_2SO_4$) viscosity measurements at 25° C.

The preferred polymers are those possessing a high theoretical aldehyde function, i.e., when the polymer is subjected to conventional tests for the presence of aldehyde groups (e.g., addition of hydroxylamine hydrochloride and titrated liberated $H_2O$ with Karl Fischer reagent)

the results show a high percent, e.g., above 90%, and preferably 95% to 99%, of the theoretical aldehyde groups present as such or in the hydrated form. Many of the preferred polymers have the aldehyde groups present in the hydrated form as

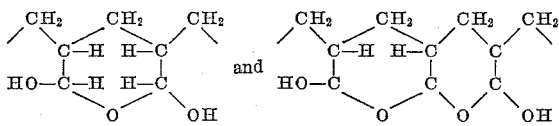

Many of the preferred polymers are also insoluble in water and insoluble in conventional solvents, such as benzene, toluene, acetone, and the like. They may be used as such or they may be converted to the soluble form as by treatment with various materials, such as sulfur dioxide, sodium sulfite, mercaptans, alcohols and the like.

The above-described acrolein polymers may be prepared by a variety of different methods. They may be prepared, for example, by heating the acrolein with free radical catalysts, such as peroxides as benzoyl peroxide, tertiary butyl hydroperoxide, tertiary butyl perbenzoate, tertiary butyl peracetate and the like, in bulk, emulsion or suspension systems.

Soluble forms of the polymers may also be used. This conversion from insoluble to soluble derivatives may be accomplished by variety of methods. The conversion is preferably accomplished by suspending the high molecular weight polymer in an aqueous solution containing the water-solubilizing agent, such as, for example, sulfur dioxide or an alkali bisulfite as sodium bisulfite. The amount of polymer added will vary depending on the particular agent involved and concentration of the agent. In general, it is preferred to add from 1 to 50 parts of the polymer of the agent. In general, it is preferred to add from 1 to 50 parts of the polymer per 100 parts of water. The concentration of the solubilizing agent will generally vary from about 1% to about 25%. Stirring and heating may be applied to assist in the dissolution. Temperatures employed will generally vary from about 20° C. to about 90° C. Various other means, such as addition of small amounts of acid catalysts or the addition of swelling agents, such as acetone, tetrahydrofuran, etc. may also be employed in the dissolution.

High molecular weight acrolein polymers and their soluble forms which give outstanding results in the process of the invention are described and claimed in copending patent application Serial No. 859,156, filed December 14, 1959, now Patent No. 3,079,357, and copending application Serial No. 859,154, filed December 14, 1959, now Patent No. 3,167,529, and so much of the disclosure of these two applications relative to these polymers and derivatives and their preparation is incorporated into this application.

The preparation of some of the acrolein polymers by the above-noted method is illustrated below.

*Polymer A.*—100 parts of acrolein was added to 400 parts of water, to this mixture was added .271 part of potassium persulfate, .203 part of ferrous chloride tetrahydrate, 1 part of nonyl-phenol-ethylene oxide adducts as anti-coalescent agent and .4 part of disodium salt of ethylene diamine tetracetic acid. The resulting mixture was stirred for 24 hours at room temperature under atmosphere of nitrogen. During this period a white solid precipitated to the bottom. The mixture was filtered and the solid precipitate was washed with water and dried to yield 47 parts of polymer. The resulting product was a white powder polymer having an intrinsic viscosity (as determined on the sulfur dioxide solubilized form) of 1.8 dl./g.

*Polymer B.*—100 parts of acrolein was added to 300 parts of water and to this mixture was added .272 part potassium persulfate, .203 part of ferrous chloride tetrahydrate and .4 part of disodium salt of ethylene diamine tetracetic acid. The resulting mixture was stirred for 25 hours at 0° C. under an atmosphere of nitrogen. During that period a white solid precipitated to the bottom. The mixture was filtered and the solid precipitate was washed with water and dried to yield 27 parts polymer. The resulting product was a white powder polymer having an intrinsic viscosity (as determined on the sulfur dioxide solubilized form) of 2.3 dl./g.

*Polymer C.*—1000 parts of acrolein was added to 2000 parts of water and to this mixture was added 2.73 parts of potassium persulfate, 2.02 parts ferrous chloride tetrahydrate, 10 parts of nonylphenol-ethylene oxide condensate and 4 parts of disodium salt of ethylene diamine tetracetic acid. This mixture was stirred for 42 hours at room temperature (20° C.) under nitrogen. The resulting product was a white powder polymer having an intrinsic viscosity of 1.5.

*Polymer D.*—100 parts of acrolein was added to 325 parts of water and to this mixture was added 2.70 parts of potassium persulfate, 2.00 parts of ferrous chloride tetrahydrate and 4 parts of disodium salt of ethylene diamine tetracetic acid. This mixture was kept at room temperature for 6 hours with stirring and under an atmosphere of nitrogen. The resulting 46 parts product was a white powder polymer having an intrinsic viscosity of 1.02 dl./g.

*Polymer E.*—10 parts of the solid Polymer A prepared as above was added to aqueous $SO_2$ solution and the mixture heated to 50° C. After a few minutes, the polymer dissolved to form a clear solution. Analysis indicated the polymer contained plurality of structural units

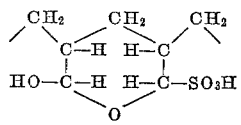

*Polymer F.*—10 parts of the solid Polymer B prepared as above was added to water to form a suspension thereof. Sodium bisulfite was then added and the mixture heated to 50° C. After a few minutes, the polymer dissolved to form a clear solution. Analysis indicated the polymer contained plurality of structural units

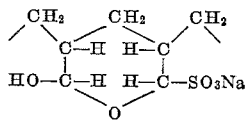

The new polymeric polyhydroxy polycarboxylic acids of the present invention are prepared by treating and reacting the above-described acrolein polymers with a basic material which a dissociation constant greater than $2.0 \times 10^{-5}$. The basic materials used in the reaction are preferably the alkali metal hydroxides, alkaline earth metal hydroxides, strong amines, ammonium hydroxide and the like. Preferred materials to be employed are the water-soluble hydroxides and basic salts of the alkali metals, sodium, potassium and lithium and ammonium hydroxide and basic salts. The pH value of the reaction mixture is preferably between about 8 and 14. When expressed on a normality basis, it is preferred to use reaction media having a normality greater than 0.1 N and preferably between 0.5 N and 10 N.

The degree of alkalinity employed will vary depending on the degree of conversion of the aldehyde or hydrated aldehyde groups to the OH and carboxyl groups. Theoretically one mole of caustic is needed for every two aldehyde groups converted. To obtain high degree of conversions, such as 70 to 90% conversion, solutions of higher normality should be employed, while for the lower conversions lower normality may be utilized.

The reaction may be accomplished in an aqueous medium or in an inert solvent medium, such as in alcohol and the like. Best results, however, are obtained when conducted in an aqueous medium.

Dilute solutions or suspensions of the polymer are preferred. The concentration of the polymer in the reaction mixture will preferably vary from about 0.01% to 5% and more preferably from 0.1% to 4%.

The temperature employed in the reaction will generally range from about 0° C. to as high as 60° C. Preferred temperatures range from about 15° C. to 50° C. Atmospheric, subatmospheric or superatmospheric pressures may be utilized as desired.

In most cases, the polymers will dissolve in the alkaline medium in a few minutes and the reaction should be complete in the matter of a few hours. Reaction times generally vary from about 20 minutes to about 50 hours.

At the conclusion of the reaction, acid is then added to convert the reaction product to the acid form. This is accomplished merely by adding acids, such as hydrochloric, sulfuric or the like in dilute form to the mixture until the product precipitates. This is at about a pH of 3 to 5. The precipitate is then preferably washed with water and dried.

The new polymeric hydroxy carboxylic acids prepared by the above process will vary from thick liquids to solids depending on starting polymers. In most cases, the new products will have better solubility characteristics than the starting polymers. Thus, while the starting polymers are generally insoluble except in special reactive solvents, the new products have some solubility in some non-reactive solvents as dioxane and the like. While some of the new products may be insoluble in water they can be made water-soluble by formation of the water soluble salt. The acids will have substantially the same molecular weight as the starting polymers from which they are prepared as there is very little if any degradation taking place during the above treatment.

The amount of the hydroxyl groups and carboxyl groups present in the product will depend upon the extent of reaction with the alkaline as noted above. Preferred products have from 20% to 90% and still more preferably about ⅓ of the aldehyde groups or hydrated group converted to the hydroxyl and carboxyl groups. When less than 100% conversion is made, the resulting polymer will, of course, still possess the aldehyde groups or hydrated aldehyde groups, as noted above. Those products derived from the bisulfite solubilized form will contain

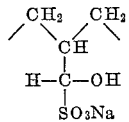

groups, and those produced from the straight polymer will possess

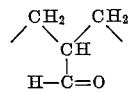

groups or their hydrated form.

The water-soluble salts of these polymeric acids may be prepared by any conventional method, as by reacting the acids with salts or hydroxides of the desired metals, e.g., sodium hydroxide and the like, preferably in the presence of a diluent as water, alcohol, and the like. Some of the salts are formed during the initial preparation of the acid so in that case it will not be necessary to convert to the acid and then back to the salt, but the salt may be recovered directly from the reaction mixture. The salts may be recovered by evaporation, distillation of the diluent, crystallization and the like. The salts are recoverable as solids and preferably crystalline solids.

The above-described water-soluble salts are added to the soil in the form of an aqueous solution. Such solutions are prepared by merely adding the salts to the desired amount of water and stirring until dissolved. The concentration of the salt solutions to be employed may vary over a considerable range. In general, the concentration will preferably vary from about 0.1% by volume to 10% by volume. Preferred concentrations will vary from about 1% to 3% by volume.

The application of the aqueous solutions to the soil may be by any technique, such as injecting, spraying, mixing and the like. In some cases, it is preferred to merely drench the soil as by spraying with the aqueous solution and let it seep down into the soil. Sufficient solution is generally used so as to effect substantial saturation of the surface soil, i.e., the soil within say 1 to 5 inches of the surface. In the event the solution is used to consolidate soils around bore holes in oil wells or areas around mining shafts deeper penetration as desired can be accomplished.

When the aqueous solution is employed in consolidating soil particles in earth formations surrounding bore holes it is generally preferred to pump the solution down through a string of tubing and into the loose formation to be consolidated. In general, it is preferred to isolate a zone of the borehole adjacent to the formation to be treated, pump the aqueous solution into the formation through the isolated zone, retain the solution in the formation for sufficient time to permit consolidation of the soil particles and then start producing the well.

When used in the above-noted process, the aqueous solutions of the invention may be used by themselves or in admixture with other treating agents or with other known consolidating agents.

The type of soil to be consolidated may vary over a wide range. The soil may be sandy, clay-type, porous, non-porous, rocky, fine, organic soils such as peat, calcareous soils and the like. The sandy soils are the more preferred.

To illustrate the manner in which the invention may be carried out, the following examples are given. It is to be understood, however, that the examples are for the purpose of illustration and the invention is not to be regarded as limited to any of the specific conditions or reactants recited therein. Unless otherwise indicated, parts described in the examples are parts by weight.

Example I

This example illustrates the use of the polymeric polyhydroxy polycarboxylic acid salts as stabilizers for sand.

12.0 parts of polyacrolein having an intrinsic viscosity of 1.0 dl./g. prepared by polymerizing acrolein in an aqueous system using tertiary butyl hydroperoxide as catalyst was stirred with 550 parts of water and 550 parts of 1 N NaOH added thereto. After stirring for several hours, the solid polyacrolein dissolved in the alkaline solution to form the desired polyhydroxy polycarboxlic acid salt. Analysis indicated the product contained units of

The above-noted aqueous solution of the sodium salt was diluted with water to form solutions having the following concentrations:

These solutions were then applied to sand in two ways. In the first series of experiments, 100 parts of the plaster sand was placed in containers and 20 parts of the aqueous salt solutions poured on the top so that the solution drained down into the sand. In the second series of experiments, the 100 parts of the plaster sand and 20 parts of the solutions were thoroughly mixed together and then firmed into containers and allowed to stand. In both sets of experiments, the samples were dried for 72 hours at 60° C., cooled to room temperature for 4 hours and then examined. The results are shown in the table below:

| Concentration of Aqueous Solution (Organic Basis) | Final Condition | |
|---|---|---|
| | 1st Experiment Water Drench | 2nd Experiment Soil Mixing |
| 0 | Free flowing | Free flowing. |
| 1.1% | ½ inch crust—firm | Firm. |
| 1.6% | 1 inch crust—firm | Moderately hard. |
| 2.2% | 1¼ inch crust—firm | Hard. |
| 2.7% | Hard to bottom | Very hard. |

Example II

Example I was repeated with the exception that the sand was replaced with Rossi clay. Related results are obtained.

Example III

Example I is repeated with the exception that the salt employed was the potassium salt of the described polyhydroxy polycarboxylic acid. Related results are obtained.

Example IV

Example I is repeated with the exception that the salt employed was the ammonium salt of the described polyhydroxy polycarboxylic acid. Related results are obtained.

Example V

Example I was repeated with the exception that salt solution was diluted to 30 parts instead of 20 parts. Related results were obtained.

Example VI

Example I was repeated as to the drench test with the exception that after the penetration of the sand, additional water was added to make the total of 30 parts. There was, of course, excess water that drained out the bottom of the containers. However, after the samples were dried and cooled, there was no observed difference in results from those obtained without the addition of the water. This indicates that the active binding agent was fixed on the soil particles and does not leach readily with additional water.

Example VII

Example I is repeated with the exception that the sand is replaced with a mixture of sand and clay. Related results are obtained.

Example VIII

Example I was repeated on sand and the samples removed from the containers as briquets and tested for force needed to crush the samples. In this case, the apparatus used was a simple lever with a fulcrum at one end, four inches out on the underside of the lever was a bearing pad under which the test briquet was placed by removing the test weight out the lever at 2 inch intervals, a point was reached at which the mold collapsed. Calculations gave the crushing force in pounds. The data is shown in the table below:

| Volume of Solution ᵃ | Force Required | |
|---|---|---|
| | Applied as Water Drench | Applied as Soil Mix |
| 0 | Free flowing | Free flowing. |
| 8 | None, ¼ inch crust | 18 lbs. |
| 12 | 10 lbs | 32 lbs. |
| 16 | 25 lbs | 40 lbs. |
| 20 | 40 lbs | 45 lbs. |

ᵃ Solution contains 2.7% organic matter plus about 2.5% of inorganic salts: sodium sulfite and sulfate.

Example IX

A small scale field trial was initiated in which 6 inch wide strips, one foot long, were sprayed with 20, 40, 60, 80 or 100 ml. of the polymer defined in Example I diluted to a total volume of 100 ml. Prior to spraying, wheat (*Triticum aestivum* L.) had been planted along the center of the strip. In about 1 week, the wheat had emerged on all treatments though somewhat retarded at rates higher than 40 mol per plot. In many of the plots the crust was firm enough that the emerging plants heaved up sections 2 inches square. During this period, rain fell in small quantities each day.

At no time was the crust hard and dry, but was firm rubbery and bendable when lifted by its edge.

Phytotoxicity tests with water grass and garden cress were run in the greenhouse with 12.5, 6.25 and 1.25 gallons of the polymer per acre placed either just below or just above the seed. There was no evidence of injury with either plant.

Example X

A sandpack representative of an unconsolidated earth formation containing connate water and oil is prepared from clear Ottawa sand having particle sizes ranging from about 40–80 mesh. The sand is tamped into a glass tube to form a porous column having dimensions of about 1 x 5″. The column is maintained at room temperature (about 18° C.) in a vertical position and fluids are displaced through it by gravity drainage.

The sand is consolidated by passing into and through the sand a 2.7% solution of the polymeric salt described in Example I. After allowing the sand to dry, additional water is added at the top and allowed to drain through the consolidated particles. This indicates that while the salt solution has consolidated the particles it still has allowed penetration of other liquids as is needed in consolidation of earth formations surrounding oil drilling strings.

Example XI

An oil-producing well completed into an unconsolidated sand is prepared for treatment by installing a tubing string provided with packer means for isolating a section of the borehole that communicates with the sand. The salt solution shown in the preceding example is then pumped into the string and forced into the unconsolidated sand formation. When sufficient time has elapsed for setting of the polymeric salt, the well is placed on production. The consolidation of the sand has effected an increase in the production of the well.

I claim as my invention:

1. A process for treatment of soil which comprises injecting into the soil an aqueous solution of a salt of a polymeric polyhydroxy polycarboxylic acid having a plurality of structural units

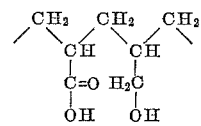

2. A process as in claim 1 wheren the salt is a water-soluble salt and the polymeric polyhydroxy polycarboxylic acid has a molecular weight between 75,000 and 2,000,000 as determined by the light scattering technique.

3. A process as in claim 1 wherein the salt of the polymeric polyhydroxy polycarboxylic acid also contains a plurality of structural units as

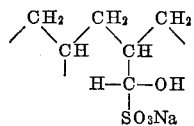

and the polymer has a molecular weight between 75,000 and 2,000,000 as determined by the light scattering technique.

4. A process as in claim 1 wherein the alkali metal salt is a sodium salt.

5. A process as in claim 1 wherein the alkali metal salt is a potassium salt.

6. A process as in claim 1 wherein the water-soluble salt is an ammonia salt.

7. A process for treating porous earth formation surrounding a borehole comprising the steps of isolating a zone of said borehole adjacent to the formation to be treated, pumping an aqueous solution of a salt of a polymeric polyhydroxy polycarboxylic acid having a plurality of structural units.

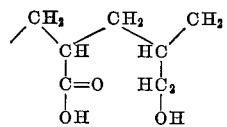

into said formation and through said isolated zone of said borehole, retaining the solution for sufficient time to effect hardening of the soil particles and then producing the well.

References Cited by the Examiner

UNITED STATES PATENTS

| | | | |
|---|---|---|---|
| 2,801,985 | 8/1957 | Roth | 260—41 |
| 3,078,920 | 2/1963 | Ten Brink | 166—33 |
| 3,227,688 | 1/1966 | Kern et al. | 260—67 |

CHARLES E. O'CONNELL, *Primary Examiner.*

T. A. ZALENSKI, *Assistant Examiner.*